United States Patent
Van Wiemeersch et al.

(10) Patent No.: US 12,103,494 B2
(45) Date of Patent: Oct. 1, 2024

(54) FACIAL RECOGNITION ENTRY SYSTEM WITH SECONDARY AUTHENTICATION

(71) Applicant: FORD GLOBAL TECHNOLOGIES, LLC, Dearborn, MI (US)

(72) Inventors: John R. Van Wiemeersch, Novi, MI (US); Ryan E. Hanson, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 53 days.

(21) Appl. No.: 17/991,059

(22) Filed: Nov. 21, 2022

(65) Prior Publication Data

US 2024/0166165 A1   May 23, 2024

(51) Int. Cl.
*B60R 25/25* (2013.01)
*B60R 25/23* (2013.01)
*G06V 40/16* (2022.01)

(52) U.S. Cl.
CPC .............. *B60R 25/25* (2013.01); *B60R 25/23* (2013.01); *G06V 40/16* (2022.01); *B60R 2325/205* (2013.01)

(58) Field of Classification Search
CPC ... B60R 25/25; B60R 25/23; B60R 2325/205; G06V 40/16
USPC ......................................................... 340/5.2
See application file for complete search history.

(56) References Cited

U.S. PATENT DOCUMENTS

| | | | |
|---|---|---|---|
| 10,343,650 B1 | 7/2019 | Ahmad | |
| 10,421,435 B2 * | 9/2019 | Pophale | ............... B60R 25/243 |
| 10,559,143 B1 | 2/2020 | Shen | |
| 2015/0349959 A1 * | 12/2015 | Marciniak | ............... G06F 21/32 |
| | | | 713/186 |
| 2016/0364009 A1 * | 12/2016 | Lemberger | ......... H04N 21/4424 |
| 2020/0238952 A1 * | 7/2020 | Lindsay | ............... G06V 30/194 |
| 2021/0213909 A1 * | 7/2021 | Petersson | ............... B60R 25/31 |
| 2022/0024415 A1 | 1/2022 | Wu et al. | |
| 2022/0219643 A1 | 7/2022 | Hanson et al. | |

* cited by examiner

*Primary Examiner* — Kam Wan Ma
(74) *Attorney, Agent, or Firm* — Frank L. Lollo; MacMillan, Sobanski & Todd, LLC

(57) ABSTRACT

A vehicle entry system which identifies authorized users via facial recognition has an image sensor configured to capture real-time images according to a predetermined field of view from a vehicle. A lockout device is configured to selectably provide access to the vehicle. The entry system has a controller configured to (A) analyze a first one of the captured images for matching to a stored facial pattern corresponding to an authorized user of the vehicle, (B) detect a request for a secondary authentication after the captured image being analyzed fails to match the stored facial pattern, (C) analyze a second one of the captured images for a nonbiometric secondary code entrusted to a secondary user, and (D) issue a command for the lockout device to grant the access to the vehicle when the secondary code is detected.

18 Claims, 5 Drawing Sheets

FACIAL RECOGNITION ENTRY SYSTEM WITH SECONDARY AUTHENTICATION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to a camera-based biometric security system having an alternate authentication method available when a biometric identification fails to be made, and, more specifically, to a secondary authentication which is based on a secondary code which is also presented via one or more camera images.

Motor vehicle entry and security systems are intended to prevent unauthorized access into a passenger cabin and storage compartments as well as restricting access to certain vehicle functions such as starting and/or engaging a powertrain to drive the vehicle. Physical keys and wireless key fobs have been used as a basis for controlling access in accordance with physical possession of a key device. Some fob devices operate such that when a button is pressed on the fob, the device sends a code to the vehicle to instruct the vehicle to unlock a locked closure (e.g., door, liftgate, or trunk lid). Passive entry passive start (PEPS) fobs may include a transponder following a challenge/response protocol to unlock a door when a user grasps the door handle, pinches or pushes a button, or approaches the vehicle within a predetermined distance.

Another type of entry system known as Phone-as-a-Key (PaaK) has been introduced in which users employ their smartphones to unlock a vehicle. These systems may operate in much the same way as a key fob, but may typically communicate with the vehicle using Bluetooth Low Energy (BLE), Ultra-Wide Band (UWB), NFC, or other mobile device wireless technologies.

Other types of security systems are known which do not require an authorized user to possess a key, key fob, or phone in order to access a vehicle. For example, keypad-based systems are known wherein a keypad positioned on the exterior of a vehicle may be used to unlock the vehicle based on a secret numeric code entered on the keypad or to lock the vehicle based on a secret numerical code or a publicly known code.

Due to various issues such as space and cost, a typical keypad may have about 5 to about 10 push buttons. In view of the code length that may be easily remembered and/or entered by the user, a typical numeric code may have from about 5 to 7 digits. While a high degree of security is obtained, even higher levels of security can be obtained with biometric systems which employ sensors to uniquely identify and authenticate a user. Recent examples include fingerprint scanners and facial recognition systems, either of which may employ general purpose or specialized cameras and other image sensors. In such a system, biometric data sensed for each particular authorized user is collected in advance, and each user's data is enrolled into the security system.

When a biometric identification system is incorporated into a vehicle design, the placement of a keypad on the vehicle is typically omitted to avoid the associated costs or because the biometric sensors consume much of the same space use by keypads at the primary access point. However, one particular advantage of a keypad-based system is lost. Namely, a user/owner of a vehicle loses the ability to share a secret numeric code with a person whom it is desired to provide access to the vehicle when the user/owner is unavailable or when their biometric identification is unsuccessful. For example, when a user is away from the vehicle, a need may arise for a third party to gain entry in order to retrieve some article within the vehicle. With a keypad present on the vehicle, the owner would be able provide their numeric code to the third party over the phone or via text in order to grant vehicle access without the owner being required to visit the vehicle. This is not possible with a biometric system. The individual must have been programmed to the vehicle on some prior occasion to be recognized and authenticated for entry.

SUMMARY OF THE INVENTION

In one aspect of the invention, a vehicle entry system is provided which has an image sensor configured to capture real-time images according to a predetermined field of view from a vehicle. A lockout device is configured to selectably provide access to the vehicle. The entry system has a controller configured to (A) analyze a first one of the captured images for matching to a stored facial pattern corresponding to an authorized user of the vehicle, (B) detect a request for a secondary authentication after the captured image being analyzed fails to match the stored facial pattern, (C) analyze a second one of the captured images for a nonbiometric secondary code entrusted to a secondary user; and (D) issue a command for the lockout device to grant the access to the vehicle when the secondary code is detected.

DETAILED DESCRIPTION OF PREFERRED EMBODIMENTS

The present invention may use a camera sensor to collect input data representative of nonbiometric secondary authentication codes (e.g., codes not tied to individual characteristics of the person gaining access but which are recognizable from camera images). Such secondary codes may include alphanumeric keypad codes which are entered via one or more camera images instead of pushbutton switches or touch sensors. The camera sensor may include ordinary peripheral monitoring cameras (e.g., side-looking cameras, backup cameras, etc.) or specialized biometric cameras such as facial recognition cameras or fingerprint scanning cameras. Secondary code input methods may fall into several categories, such as: a) absence of any input devices or tools, b) simple generic tools and devices, c) pre-enrolled objects, or d) interactive devices. The invention may be practiced in any vehicles having exterior cameras that are tied to a vehicle controller with image processing capability. Facial recognition may be retained as the primary device-free authentication modality, while a secondary authentication option can reinstate some benefits associated with the use of keypad code entry. Once a user is authenticated, additional gestures or codes may be utilized to control access to accessory functions of a vehicle beyond just an unlocking function.

More particularly, the invention may primarily rely on a facial recognition system reader for an initial authentication attempt, and then switches to a secondary code authentication when the facial recognition operation fails. Even if the facial recognition attempt fails, an image of a secondary user gaining access via a secondary (nonbiometric) code can be stored for subsequent confirmation of the activities by the primary user or owner. In some embodiments, an arbitrarily high level of security can be achieved by choosing a corresponding secondary code (e.g., based on a length of an alphanumeric code, series of gestures, or type of graphical depictions).

Figure 1:
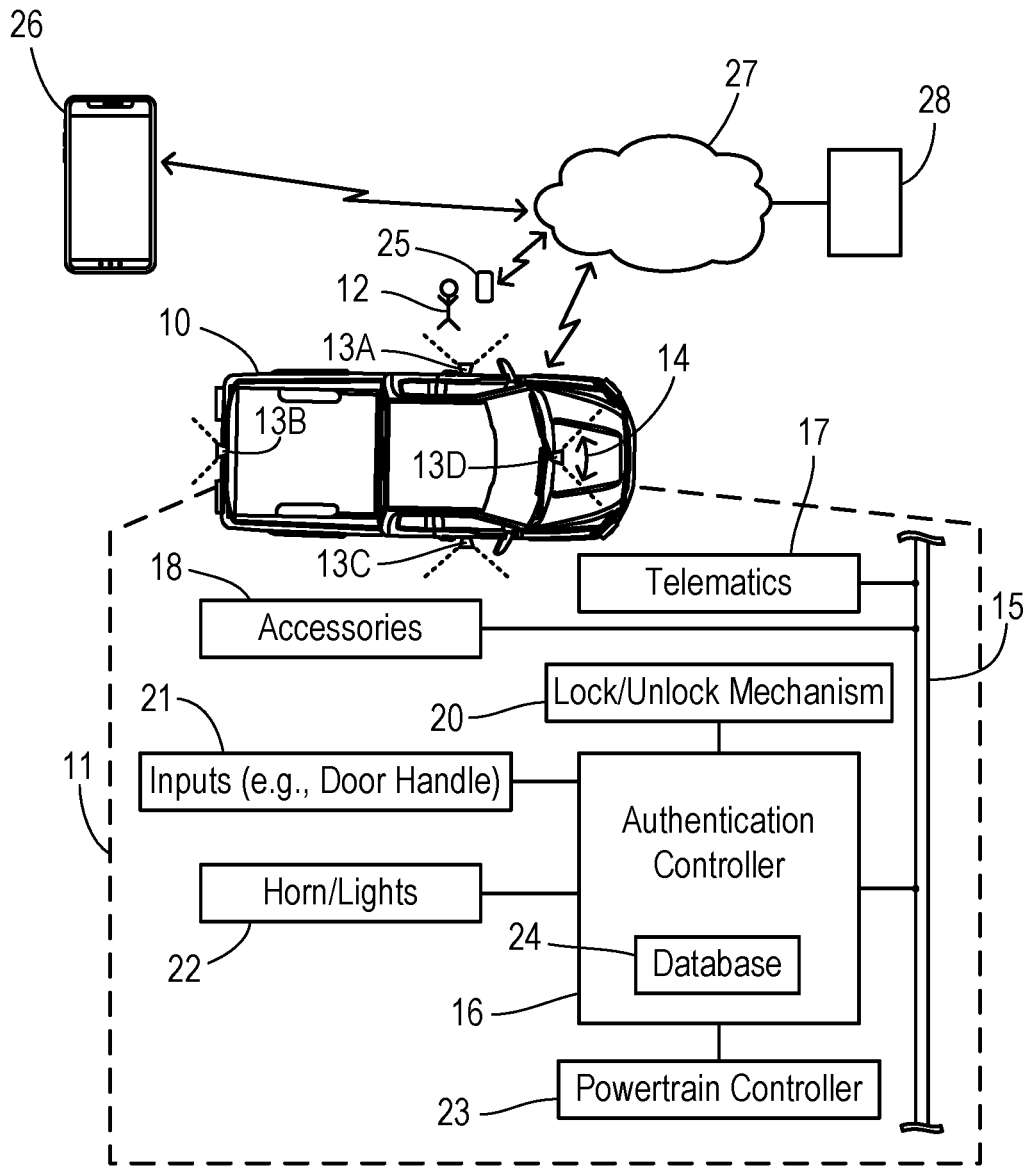
FIG. 1 is a schematic diagram showing a vehicle and remote resources for a first embodiment of a security system.

Referring to FIG. 1, a vehicle 10 includes onboard systems 11 supporting a vehicle entry function which includes authenticating a secondary user 12. A primary user is one who has an active biometric template enabling biometric authentication (e.g., an owner or regular driver of vehicle 10). As used herein, a secondary user may be someone other than a primary user, and may include a primary user in the event that biometric authentication is inoperative. Vehicle 10 has one or more image sensors such as cameras 13A-13D deployed to obtain respective fields of view (FOV) directed to the exterior of vehicle 10, such as FOV 14 for camera 13D. Some onboard systems 11 are interconnected by a communication bus 15, enabling an authentication controller 16 to exchange data and commands with a telematics module 17 and other accessory modules 18. Authentication controller 16 is also coupled to a door lock/unlock mechanism 20, activation inputs 21 (e.g., door handle activation sensors), feedback devices 22 (e.g., car horn, chirper, and/or exterior lights), and a powertrain controller 23.

Authentication controller 16 includes a database 24 storing biometric data and nonbiometric data used in assessing whether a person presenting to vehicle 10 is recognized as having authorized access. A biometric access check may be performed when an entry request is triggered by the presenting person contacting or moving a door handle. Biometric data is collected by one of the cameras and checked against prestored templates for facial recognition, fingerprint recognition, or other camera-based biometric analysis. If biometric identification fails (e.g., a face captured in a first image does not match any preexisting facial template), then a person may be considered to be a secondary user 12, and a secondary authentication may be undertaken.

To indicate biometric failure, authentication controller 16 may generate a notification signal by activating feedback device 22 (e.g., a horn chirp or flashing a light). In response, secondary user 12 may request the secondary authentication by repeating the initial trigger (e.g., touching the door handle). An audible or visible confirmation signal can be generated by authentication controller 16 to indicate the start of a time window during which a second image or images are captured for comparison with one or more secondary codes. A secondary code may be comprised of visual content including alphanumeric strings, graphics, symbols, sequence of graphics, or gestures, for example.

Some types of secondary codes may require no input devices or tools, such as hand gestures. Other types of secondary codes may use simple generic tools or devices, such as a pen and paper in order to write down an alphanumeric string. Pre-enrolled objects which may be carried by secondary user 12 can be used as a secondary code, such as a selected currency, badge, or type of credit card. Other types of secondary codes may be retrieved and/or displayed using interactive devices such as a smartphone. For example, secondary user 12 carries a smartphone 25 which communicates with a smartphone 26 of a primary user via a communication network 27. The primary user may transmit a pre-stored secondary code (e.g., alphanumeric string) to secondary user 12 via a text or MMS (Multimedia Messaging Service) message. Secondary user 12 may manipulate smartphone 25 to display a large version of the received secondary code and then presents it into the field of view of camera 13A.

Network 27 may be further connected to a central server 28 which may supplement database 24 for storing secondary codes. Central server 28 may also receive and store camera images captured by cameras 13A-13D. In particular, whenever a secondary authentication is triggered then an image containing a picture of secondary user 12 for which no biometric match was made can be stored for security purposes.

Figure 2:
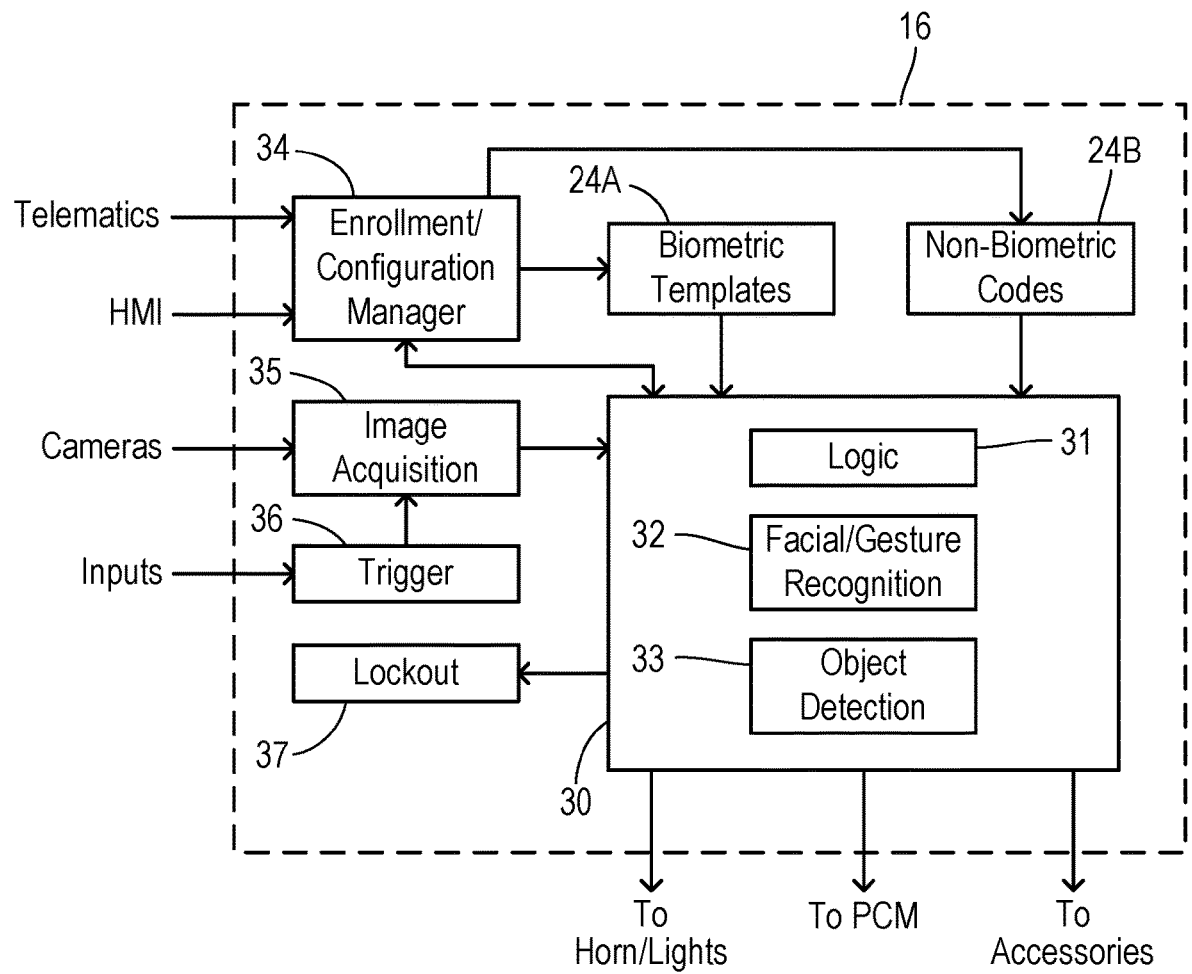
FIG. 2 is a block diagram showing a vehicle entry control system in greater detail.

FIG. 2 shows authentication controller 16 in greater detail. A main processor 30 includes logic 31 which directs operation according to the processes described herein. A program block 32 performs facial recognition and/or gesture recognition by comparing captured images to prestored templates (biometric and nonbiometric). A program block 33 performs object detection to isolate regions of interest in captured images and to identify the presence of prestored objects. Database 24 includes a biometric template dataset 24A and a nonbiometric (secondary) code dataset 24B. An enrollment and configuration manager 34 is coupled to main processor 30, datasets 24A and 24B, a human machine interface (HMI) such as a touchscreen control panel, and the telematics module. Manager 34 is activated when a primary user enrolls their biometric template and when they wish to set up a secondary code for use when they wish to grant vehicle access to others.

An image acquisition block 35 is coupled to the image sensor(s) and is activated by a trigger block 36 which responds to inputs which sense the request of the secondary user to initiate a secondary authentication. Main processor 30 is configured to send commands to (1) a horn and/or exterior lights to generate perceptible notifications, (2) a powertrain controller to execute powertrain functions such as engine starting, and (3) accessory modules to execute accessory functions (e.g., unlock all doors, unlock cargo area, roll down windows, roll up windows, or activate lighting). Main processor 30 can be further configured to send a notification to the primary user (via the telematics module) when a secondary authentication is attempted. Such a notification can include an image on which the attempted biometric authentication was based in order to confirm the identity of the secondary user.

Figure 3:
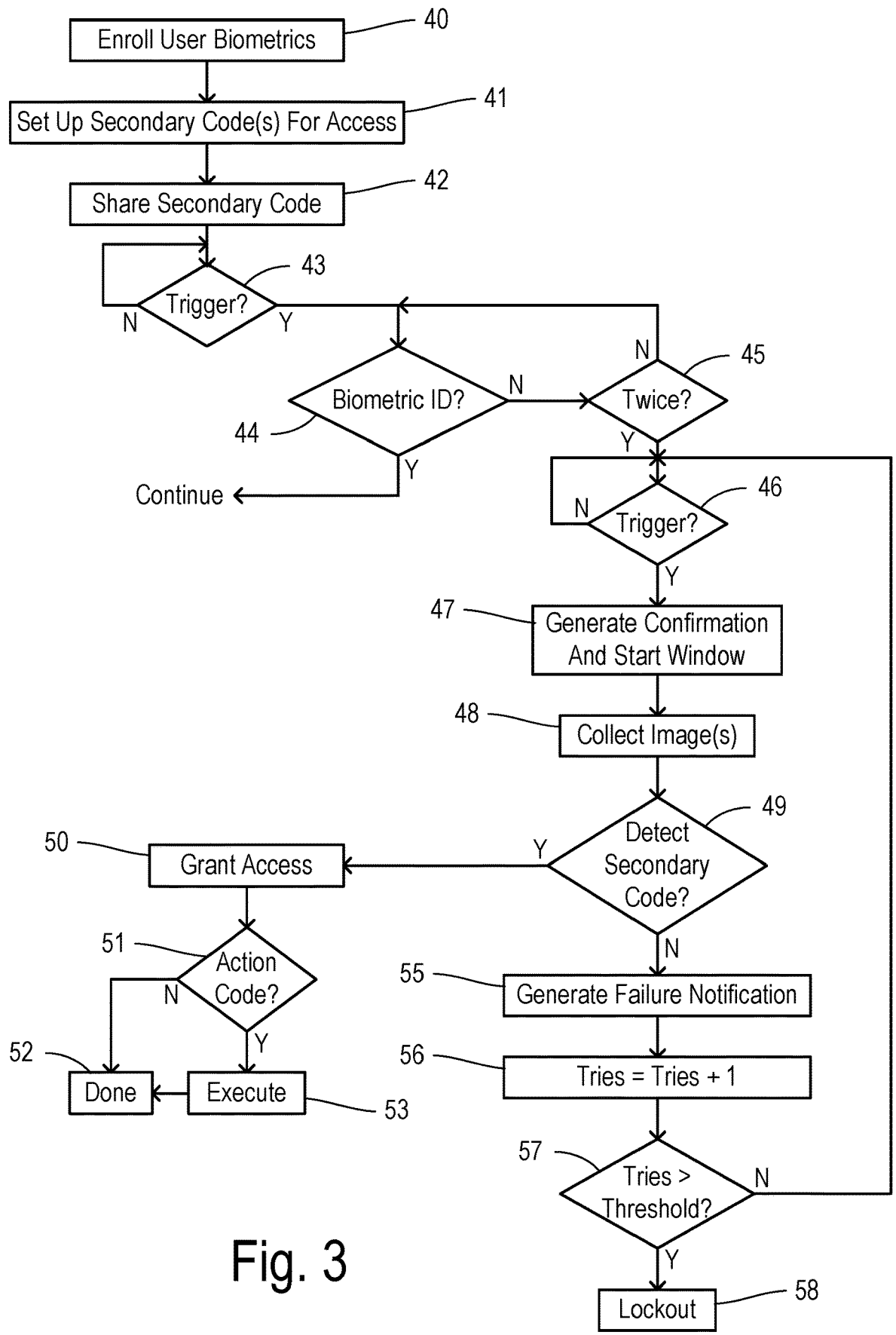
FIG. 3 is a flowchart showing one preferred embodiment of the invention.

FIG. 3 shows one preferred method of the invention for providing secondary authentication as a backup to biometric authentication. In step 40, a primary user enrolls biometric data to create templates used in camera-based biometric authentication. In step 41, the primary user further sets up secondary codes for enabling access for a secondary user without biometrics. Secondary biometric codes may be set up in advance or can be designated by a primary user remotely (via the telematics module) at a time when enabling a secondary access becomes desired. In step 42, the primary user shares the secondary code with a secondary user whom the primary user wishes to enable access to the vehicle. Access may include unlocking the vehicle and in some cases operating other powertrain or accessory features of the vehicle (e.g., a driveaway function enabling a user to initiate vehicle movement). In some cases in which a secondary user has entered the vehicle, a secondary code for accessing powertrain or accessory features may be captured with an interior camera.

Upon approaching the vehicle, a secondary user may perform a known type of action which triggers biometric authentication, such as tapping or activating a door handle. In step 43, a check is performed to determine whether a trigger has been received. Once there is a trigger, then a check is performed in step 44 to determine whether a biometric identification is successfully achieved. If a biometric identification is successfully performed, then a known process is followed which will not be further described.

In the event that the biometric identification fails then a nonbiometric secondary authentication may potentially be pursued. In a preferred embodiment, more than one failed attempt based on biometrics must occur to ensure that a nonbiometric authentication is not prematurely triggered. Thus, a check is performed in step 45 to determine whether there has been two successive failures based on biometric input. If there has not yet been two failures then a return is made to step 44 to reattempt a biometric identification. Once there has been two successive failures then a check is performed in step 46 to determine whether the secondary user repeats the access trigger.

In some embodiments, upon failure of the biometric identification then the authentication controller may generate a failure notification (e.g., horn chirp) to inform the person of that failure. Once the trigger is detected in step 46, then the authentication controller generates a confirmation signal via a horn chirp or exterior lamp flash and concurrently starts a time window for accepting a secondary code in step 47. During the window, second images are captured in step 48 to attempt recognition of a stored secondary code. When a secondary code is an alphanumeric string, for example, then the second images may be scanned for the presence of the secondary code embedded within a longer string of detected text.

In step 49, a check is performed to determine whether a valid secondary code has been detected. If so, then access to the vehicle is granted in step 50. Access may include unlocking of a door or granting the ability to execute various powertrain or other accessory functions. In some embodiments, a further option may be presented to specify among the available accessory or powertrain functions using supplemental image content or gestures which may be presented during collected of additional images after the secondary code has been recognized. A supplemental action code may be manifested by the secondary user using the same types of codes such as alphanumeric, graphic, or gestures. A check is performed in step 51 to determine whether an action code has been detected. If not, then the method completes at step 52. Otherwise, an identified action is executed in step 53 before the method completes at step 52.

If a secondary code has not been detected in step 49 and if the time window for entering a secondary code closes, then a failure notification may be generated in step 55. To limit the number of attempts at secondary access, a number of tries at secondary access can be monitored using a variable (TRIES) which is incremented in step 56. If the number of tries exceeds a threshold in step 57, then further access may be locked out in step 58. If less than the threshold, then a return is made to step 46 to allow the secondary authentication to be re-triggered and a new time window initiated.

Figure 4:
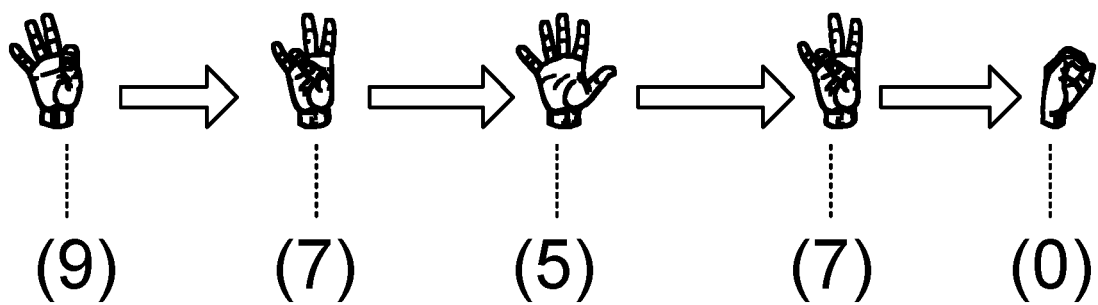
FIG. 4 is a schematic diagram showing a series of gestures according to presentation of a secondary code.

Among the types of nonbiometric secondary codes that can be captured using one or more of the second images there is an alphanumeric series of characters, which can include just numbers or just text (e.g., a phrase) or any combination of letters, punctuation, and numbers. Another type of secondary code is a graphic pattern, which may include a picture, drawing, logo, or representation of any object. Another type of secondary code comprises gestures performed by the secondary user. This can be a single predetermined gestures or a series of predetermined gestures. The gesture(s) may be uniquely defined or can be comprised of publicly known gestures such as sign language. FIG. 4 shows an example of a series of gestures representing a series of numbers using finger spelling (i.e., manual alphabet) of American Sign Language (ASL). In this example, the secondary code itself is the number 97570. The number can be communicated to the vehicle via its camera images by performing the illustrates series of hand gestures which are captured by a corresponding series of images during the time window provided for input.

Figure 5:
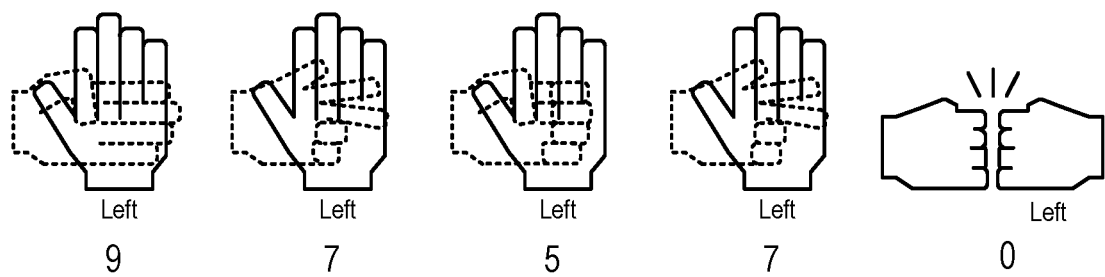
FIG. 5 is a schematic diagram showing another example of a system of gestures for presenting a secondary code.

FIG. 5 shows an example of uniquely defined hand gestures of a type that can represent digits 0 through 9. In order to shield nearby observers from seeing the secret series of gestures to represent the secondary code, at least some of the hand gestures in FIG. 5 are comprised of one open hand (e.g., the left hand) being held vertically in front of the secondary user's body and oriented toward the vehicle camera. The other hand (e.g., right hand) is placed in front of the open hand and different orientations of the fingers of that hand indicate different digits. Thus, the body and open hand of the secondary user can hide the appearance of the full gestures from most viewing angles, thereby making it more difficult for a potential thief to discover a secondary code.

Figure 6:
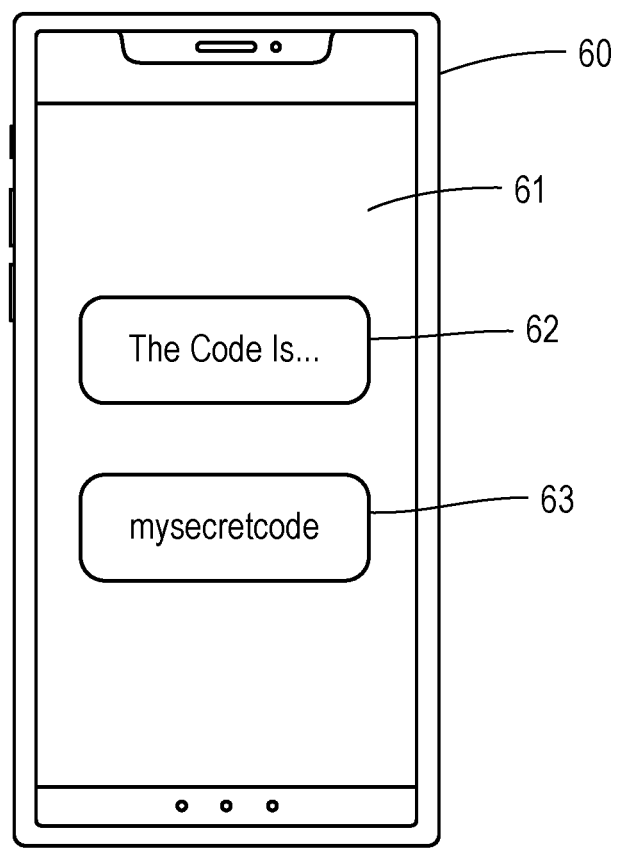
FIG. 6 is a front, plan view of a smartphone displaying a secondary code for presentation to a vehicle camera.

FIG. 6 shows one convenient manner of obtaining and displaying an alphanumeric secondary code using a smartphone 60 carried by a secondary user. In this example, the secondary user receives a text message from the primary user which is presented on a display screen 61. At a particular position in the text message, the secondary code 62 is expressed. When an image of display screen 61 is captured by the vehicle camera, all the alphanumeric content within the image can be scanned for secondary code 62. To aid in the recognition of secondary code 62, the secondary user may manipulate the screen contents (e.g., zooming in) before the image is captured in order to enlarge the relevant text while omitting extraneous text.

The generation of the secondary code may be the result of a choice by the primary user or can be randomly generated (e.g., by an app executing on the primary user's smartphone or by a central server which can be set up by the primary user to issue secondary codes under prescribed conditions). A character length of an alphanumeric secondary code can be configured to contain at least a predetermined number of characters in order to ensure any desired level of security against hacking attempts.

The nonbiometric authentication to grant access to a vehicle as described herein can be used as a single factor authentication, or it can be combined with other types of authentication (e.g., weak forms of authentication) to obtain a greater authentication strength than either form alone.

What is claimed is:

1. A vehicle entry system comprising:
   an image sensor configured to capture real-time images according to a predetermined field of view from a vehicle;
   a lockout device configured to selectably provide access to the vehicle; and
   a controller configured to:
   (A) analyze a first one of the captured real-time images for matching to a stored facial pattern corresponding to an authorized user of the vehicle;
   (B) detect a request for a secondary authentication after the captured image real-time being analyzed fails to match the stored facial pattern;
   (C) analyze a second one of the captured real-time images for a nonbiometric secondary code entrusted to a secondary user; and
   (D) issue a command for the lockout device to grant access to the vehicle when the secondary code is detected;
   wherein the controller is responsive to a trigger condition in order to initiate analyzing the first one of the captured real-time images in (A); and
   wherein the controller is further configured to generate a confirmation signal perceptible by the secondary user to indicate a start of a time window during which the at least second one of the captured real-time images is captured.

2. The vehicle entry system of claim 1 wherein the access to the vehicle is comprised of unlocking of a vehicle closure.

3. The vehicle entry system of claim 1 wherein the access to the vehicle is comprised of enabling an operation of a powertrain of the vehicle.

4. The vehicle entry system of claim 1 wherein the secondary authentication code is comprised of an alphanumeric series.

5. The vehicle entry system of claim 1 wherein the secondary authentication code is comprised of a graphical pattern.

6. The vehicle entry system of claim 1 wherein the secondary code is comprised of a series of gestures over a sequence of the captured real-time images.

7. The vehicle entry system of claim 1 wherein the request for the secondary authentication is comprised of a repetition of the trigger condition.

8. The vehicle entry system of claim 7 wherein the trigger condition is comprised of a manual contact of the secondary user with the vehicle.

9. The vehicle entry system of claim 1 wherein the controller is further configured to (1) analyze a plurality of captured images after the secondary authentication code is analyzed to identify a supplemental action code, and (2) generate a command for a vehicle accessory to execute an accessory function corresponding to the supplemental action code.

10. A method for controlling entry into a vehicle, comprising steps of:
    capturing real-time images according to a predetermined field of view from the vehicle;
    analyzing a first one of the captured real-time images for matching to a stored facial pattern corresponding to an authorized user of the vehicle;
    detecting a request for a secondary authentication by a secondary user after the first one of the captured real-time images being analyzed fails to match the stored facial pattern;
    generating a confirmation signal perceptible by the secondary user to indicate a start of a time window during which at least a second one of the captured images is captured;
    analyzing the second one of the captured real-time images for a nonbiometric secondary authentication code entrusted to the secondary user; and
    issuing a command for a lockout device to grant access to the vehicle when the secondary code is detected.

11. The method of claim 10 wherein the access to the vehicle is comprised of unlocking of a vehicle closure.

12. The method of claim 10 wherein the access to the vehicle is comprised of enabling an operation of a powertrain of the vehicle.

13. The method of claim 10 wherein the secondary code is comprised of an alphanumeric series.

14. The method of claim 10 wherein the secondary code is comprised of a graphical pattern.

15. The method of claim 10 wherein the secondary code is comprised of a series of gestures over a sequence of the captured real-time images.

16. The method of claim 10 further comprising a step of detecting a trigger condition, wherein the step of analyzing the first one of the captured real-time images is initiated in response to detecting the trigger condition, and wherein the request for the secondary authentication is comprised of a repetition of the trigger condition.

17. The method of claim 16 wherein the trigger condition is comprised of a manual contact of the secondary user with the vehicle.

18. The method of claim 10 further comprising steps of:
    analyzing a plurality of captured real-time images after the secondary authentication code is analyzed to identify a supplemental action code; and
    generating a command for a vehicle accessory to execute an accessory function corresponding to the supplemental action code.

* * * * *